US010425377B2

(12) United States Patent
Lin et al.

(10) Patent No.: US 10,425,377 B2
(45) Date of Patent: Sep. 24, 2019

(54) SYSTEMS AND METHODS TO MANAGE AN EVENT BROADCAST IN A SOCIAL NETWORK

(71) Applicant: Facebook, Inc., Menlo Park, CA (US)

(72) Inventors: Kevin Lin, San Jose, CA (US); Ryan Lin, Alviso, CA (US)

(73) Assignee: Facebook, Inc., Menlo Park, CA (US)

( * ) Notice: Subject to any disclaimer, the term of this patent is extended or adjusted under 35 U.S.C. 154(b) by 199 days.

(21) Appl. No.: 14/964,538

(22) Filed: Dec. 9, 2015

(65) Prior Publication Data
US 2017/0171138 A1 Jun. 15, 2017

(51) Int. Cl.
H04L 12/58 (2006.01)
H04L 12/18 (2006.01)
H04L 29/06 (2006.01)
G06Q 30/02 (2012.01)
G06Q 50/00 (2012.01)

(52) U.S. Cl.
CPC ............. *H04L 51/32* (2013.01); *G06Q 30/02* (2013.01); *G06Q 30/0252* (2013.01); *G06Q 50/01* (2013.01); *H04L 12/1818* (2013.01); *H04L 12/1845* (2013.01); *H04L 65/4015* (2013.01); *H04L 65/4076* (2013.01)

(58) Field of Classification Search
CPC ..... G06Q 50/01; H04L 51/32; H04L 12/1845; H04L 65/4076
USPC ........................................................ 709/206
See application file for complete search history.

(56) References Cited

U.S. PATENT DOCUMENTS

| 2007/0168228 | A1* | 7/2007 | Lawless | G06F 19/3418 705/2 |
| 2012/0226521 | A1 | 9/2012 | Bosworth et al. | |
| 2013/0054750 | A1* | 2/2013 | Rossmann | H04N 21/4788 709/219 |
| 2013/0091222 | A1* | 4/2013 | Brayman | H04L 51/32 709/204 |
| 2013/0290434 | A1* | 10/2013 | Bank | G06Q 10/10 709/206 |
| 2013/0339441 | A1* | 12/2013 | Vasquez | H04L 67/306 709/204 |
| 2014/0081882 | A1* | 3/2014 | Govindaraman | G06Q 50/01 705/319 |
| 2015/0088660 | A1* | 3/2015 | Song | G06F 3/0481 705/14.64 |
| 2015/0172227 | A1* | 6/2015 | Grove, II | H04L 51/32 709/206 |
| 2015/0347438 | A1 | 12/2015 | Arini et al. | |

* cited by examiner

Primary Examiner — Davoud A Zand
(74) Attorney, Agent, or Firm — Sheppard Mullin Richter & Hampton LLP

(57) ABSTRACT

Systems, methods, and non-transitory computer readable media are configured to monitor event information relating to an event broadcasted to an audience of a social networking system. The event information can include users who are participating in the event. It can be determined that a predetermined entity is participating in the event. A notification that the predetermined entity is participating in the event is provided during the event to at least one of a broadcaster of the event and a user participating in the event.

20 Claims, 9 Drawing Sheets

550

```
┌─────────────────────────────────────────────────────────────────────┐
│ Present event information in a graph to a broadcaster at least one  │
│ of during an event and after conclusion of the event                │
│                              552                                    │
└─────────────────────────────────────────────────────────────────────┘
                                  │
                                  ▼
┌─────────────────────────────────────────────────────────────────────┐
│ Receive a selection by the broadcaster of a position on the graph   │
│                              554                                    │
└─────────────────────────────────────────────────────────────────────┘
                                  │
                                  ▼
┌─────────────────────────────────────────────────────────────────────┐
│ Provide event information relating to a level of participation in   │
│ the event at a time corresponding to the position on the graph      │
│                              556                                    │
└─────────────────────────────────────────────────────────────────────┘
                                  │
                                  ▼
┌─────────────────────────────────────────────────────────────────────┐
│ Provide a suggestion to optimize a level of participation for a     │
│ future event of the broadcaster when a level of participation for   │
│ the event does not satisfy a threshold value                        │
│                              558                                    │
└─────────────────────────────────────────────────────────────────────┘
```

FIGURE 5B

SYSTEMS AND METHODS TO MANAGE AN EVENT BROADCAST IN A SOCIAL NETWORK

FIELD OF THE INVENTION

The present technology relates to the field of content provision. More particularly, the present technology relates to techniques for managing a broadcasted event across a social networking system.

BACKGROUND

Today, people often utilize computing devices for a wide variety of purposes. Users can use their computing devices, for example, to communicate and otherwise interact with other users. Such interactions are increasingly popular over a social networking system.

Interactions in a social networking system may include the sharing of content. In some instances, public figures can utilize the social networking system as a platform to broadcast content to an audience of fans and other interested users. When the content is interesting, the audience for the content can be large. A large audience can include various types of members in a community of the social networking system. For example, some audience members can include users who are connections with one another in a social network. As another example, some audience members can include famous personalities or authorities in relation to subject matter reflected in the content.

SUMMARY

Various embodiments of the present technology can include systems, methods, and non-transitory computer readable media configured to monitor event information relating to an event broadcasted to an audience of a social networking system. The event information can include users who are participating in the event. It can be determined that a predetermined entity is participating in the event. A notification that the predetermined entity is participating in the event is provided during the event to at least one of a broadcaster of the event and a user participating in the event.

In an embodiment, the predetermined entity is a connection of at least one of the broadcaster and the user.

In an embodiment, the predetermined entity is at least one of a verified entity, a topic authority, an expert, and an influencer.

In an embodiment, providing the notification comprises providing the notification within a threshold time duration from a time that the predetermined entity joins the event.

In an embodiment, the predetermined entity is geographically located within a threshold distance from the user.

In an embodiment, the event information includes levels of participation in the event relating to at least one of a number of users who joined the event online, a number of users who liked the event, a number of users who commented on the event, and a number of users who shared the event.

In an embodiment, the event information is presented in a graph to the broadcaster at least one of during the event and after conclusion of the event.

In an embodiment, a selection by the broadcaster of a position on the graph is received. Event information relating to a level of participation in the event at a time corresponding to the position on the graph is provided.

In an embodiment, in response to the selection of the position on the graph, one or more video frames of the event corresponding to the time corresponding to the position on the graph are presented.

In an embodiment, a suggestion is provided to optimize a level of participation for a future event of the broadcaster when a level of participation for the event does not satisfy a threshold value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5B illustrates a second method to manage a broadcasted event, according to an embodiment of the present technology.

Figure 1:
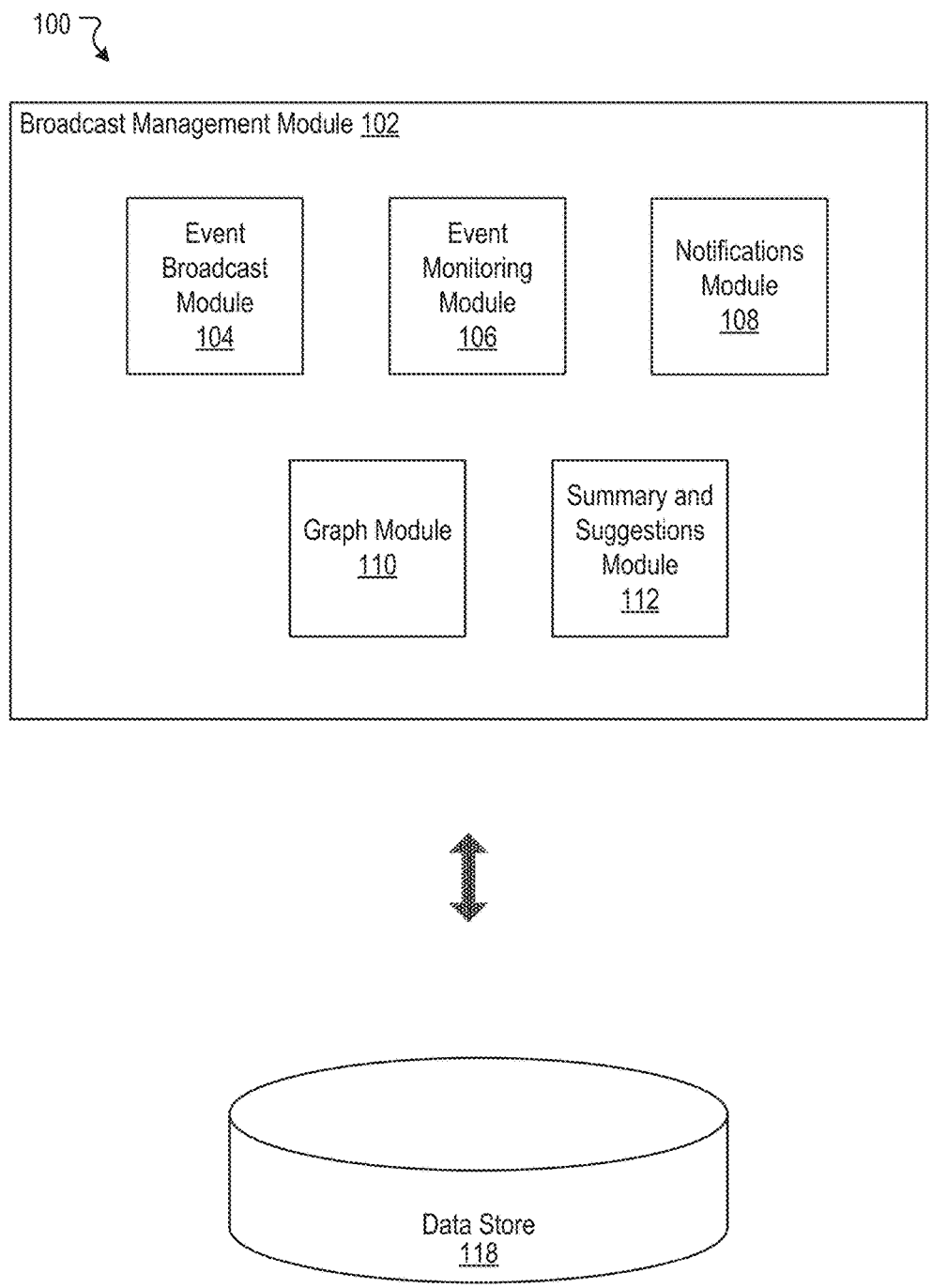
FIG. 1 illustrates a system including an example broadcast management module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing a Broadcast Event

As mentioned, interactions in a social networking system may include the sharing of content. In some instances, public figures can utilize the social networking system as a platform to broadcast content to an audience of fans and other interested users. When the content is interesting, the audience for the content can be large. A large audience can include various types of members in a community of the social networking system. For example, some audience members can include users who are connections with one another in a social network. As another example, some audience members can include famous personalities or authorities in relation to subject matter reflected in the content.

The participation of various types of audience members in a broadcast event can be difficult to discern. For an audience member, it can be difficult to know the other audience members who are participating in the event, especially when the number of audience members is large. For example, an audience member may not know about the presence of a connection, famous personality, authority, or other type of audience members in the audience for the event. As a result, opportunities to interact with other audience members can be lost during the event. Likewise, a broadcaster also may not know the different types of audience members present during the event, resulting in a lost opportunity to optimize the event for such audience members or otherwise acknowledge them. Further, broadcasters are often unable to learn about the nature of participation of audience members in their events, much less how to optimize the participation of audience members in their events.

An improved approach rooted in computer technology to manage information relating to an event broadcasted on a social networking system overcomes these and other disadvantages associated with conventional approaches implemented in computer technology. Systems, methods, and computer readable media of the present technology can in real time (or near real time) provide notifications during an event. For example, an audience member of the event can be notified when a connection of the audience member participates in the event. As another example, a broadcaster of an event and audience members of the event can be notified when a verified entity, such as a public figure, or an expert, such as an authority on a relevant topic, participates in the event. Upon conclusion of the event, the broadcaster can be presented with graphical information about the event. As one example; the information can relate to levels of participation in the event as the event transpired as well as cumulative information regarding the levels of participation for one or more events of the broadcaster. In addition, the broadcaster can be provided with encouragement and suggestions to improve participation in future events.

An event can be any type of occurrence or activity. For example, an event can be a performance (e.g., a concert), a sports game (e.g., Super Bowl), an entertainment spectacle (e.g., the Oscars), a presentation (e.g., a lecture), a political (e.g., White House inauguration) or social (e.g., Papal visit) occurrence, etc. An event can be associated with a large audience or a small audience. An event can occur in real life or before a community of interested users on a communications platform, such as a social networking system, or both. Although some of the examples discussed herein may relate to certain events, the present technology can be implemented for any and all suitable types of other events. More details regarding the present technology are discussed herein.

FIG. 1 illustrates an example system 100 including an example broadcast management module 102 configured to allow selective management of information associated with a broadcasted event, according to an embodiment of the present technology. In some embodiments, the broadcast management module 102 can be implemented to support an interactive page of a social networking system associated with a broadcaster of the event or an audience member of the event. The event can be broadcasted to audience members, who constitute users of a social networking system, through the page. Users can include ordinary users, verified entities, topic authorities, experts, influencers, and the like, as discussed in more detail herein. The page can present event information that is maintained or determined by the social networking system. Such event information can include, for example, notifications regarding identification of participants in the event, levels of participation in the event as the event transpires, cumulative levels of participation in one or more events, and suggestions to improve participation in future events.

The broadcast management module 102 can include an event broadcast module 104, an event monitoring module 106, a notifications module 108, a graph module 110, and a summary and suggestions module 112. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the broadcast management module 102 can be implemented in any suitable combinations.

The event broadcast module 104 can support a broadcast of an event by a broadcaster through an associated page on a social networking system to various users constituting audience members. The event broadcast module 104 can allow an administrator of a page associated with the broadcaster to conduct a live broadcast of an event managed by the broadcaster. The broadcast can be implemented as a real time (or near real time) stream of the event as the event transpires to client computing devices associated with the users. The stream can include video, audio, or both relating to the event. The event broadcast module 104 can support a live stream of the event to a selected group of audience members. The audience members can include various types of users of the social networking system. For example, based on privacy settings selected by the page, the audience members can be users who have been invited by the page to participate in the event. As another example, if the page has selected appropriate privacy settings, the audience members also can include any users of the social networking system who have chosen to participate in the event as audience members. The stream can be provided to users for consumption through various platforms running on a client computing devices, such as an app provided by the social networking system or a web browser.

The event monitoring module 106 can monitor an event and determine information relating to the event. Event information can include any data regarding, for example, the event itself, participation in the event, and interactions associated with the event. In some embodiments, the event monitoring module 106 can determine event information relating to the identities and location of users participating in the event. An identification of a user can be determined from account information associated with an account through which the user participates in the event. A location of a user can be determined from GPS information supported by a client computing device of the user, a check in performed by the user, or some other suitable technique.

In some embodiments, the event monitoring module 106 can determine event information relating to a level of participation for the event. Participation in an event can include different types of activities in relation to the event, such as online attendance with respect to the event, interactions with a broadcaster of the event as the event transpires, interactions with other users who are participating in the event, liking the event, commenting on the event, sharing the event, etc. As just some examples, event information relating to a level of participation for an event can relate to a number of users who attended the event, a number of users who liked the event, a number of users who commented on the event, and a number of users who shared the event. The event monitoring module 106 also can segment the users who are identified as participating in an event based on various categories, such as gender, age, location, and other demographic features. The event monitoring module 106 also can combine event information relating to a plurality of past events to provide an aggregated event information.

Event information regarding a level of participation can be based on time. The level of participation for an event can reflect a number of users who participated in the event during an instant in time or during a selected time interval. For example, the event monitoring module 106 can determine the identities and the number of users who were in online attendance with the event during a particular instant. As another example, the event monitoring module 106 can determine the identities and the number of users who liked the event or messaged another user participating in the event during a selected time interval.

The event monitoring module 106 also can identify certain categories of users who are participating in the event. A user constituting a verified entity can correspond to an entity that has been verified based on a verification process performed by the social networking system to be whom or what the entity purports to be. The verified entity can be associated with at least one of a public figure, a brand, a company, business, an organization, etc. The verified entity can, for instance, correspond to an official account at the social networking system for a real-world public figure, brand, company, business, organization, etc. In one example, the verified entity can correspond to a public figure, such as a celebrity, politician, reporter, or journalist, who has been verified based on the verification process. In this example, the verification process can include communicating with a representative or agent of the public figure to confirm the identity of the public figure.

The event monitoring module 106 also can identify users constituting topic authorities who are participating in the event, and can identify users constituting experts and influencers who are participating in the event. Topic authorities can include persons or other entities who are experts or knowledgeable in regard to one or more topics or subject matter to which the event relates. The identification of topic authorities is further described in U.S. patent application Ser. No. 14/586,476, entitled "Topic Authority Suggestions" and filed on Dec. 30, 2014, which is hereby incorporated by reference in its entirety.

A user constituting an expert can be a person with extensive knowledge or ability based on education, research, experience, or occupation in a specific field. Often, an expert is widely recognized as a reliable source of technique or skill, and peers or others in a specific field of the expert accord an expert's faculty for judging or deciding rightly, justly, or wisely with authority and status.

A user constituting an influencer can be a person who has the power to sway or influence others based on, for example, prestige, wealth, ability, or position. An influencer's ability to influence others can be with respect to a specific field or subject matter as well. In connection with marketing, a form of marketing, called "influencer marketing" or "influence marketing", has emerged from a variety of recent practices and studies, in which marketing focus is placed on specific key individuals or types of individuals (i.e., the influencers) rather than the target market as a whole. It identifies the individuals that have influence over potential buyers, and orients marketing activities around these influencers. Influencers may be potential buyers themselves, or they may be third parties who exist either in the supply chain (e.g., retailers, manufacturers, etc.) or who are value added influencers (e.g., journalists, academics, industry analysts, professional advisers, etc.). The determination of experts and influencers is further described in U.S. patent application Ser. No. 13/040,158, entitled "Utilize Experts and Influencers in a Social Network" and filed on Mar. 3, 2011, which is hereby incorporated by reference in its entirety.

The notifications module 108 can provide notifications to event participants. Event participants can include the page (or broadcaster) that is managing the event and users who are viewing, listening to, or otherwise consuming the event. In some embodiments, the notifications module 108 can receive information regarding participation by users in the event from the event monitoring module 106. Based on the information, the notifications module 108 can provide a notification to a user that a connection of the user is also participating in the event. In addition, based on the information, the notifications module 108 can provide a notification to one or more users participating in the event as well as to the broadcaster when a verified entity, topic authority, expert, or influencer is participating in the event. Such a notification can convey that the verified entity, authority, expert, or influencer is participating in the event. The notifications module 108 is discussed in more detail herein.

The graph module 110 can obtain event information and present the event information to a broadcaster of an event. The event information can include various types of information, such as identities of users who participated in the event, levels of participation in the event, and categories of users who participated in the event. The event information can be provided by the event monitoring module 106. Presentation of the event information to a broadcaster can provide to the broadcaster a better understanding of various aspects of a transpired event.

In some embodiments, the graph module 110 can create and present event information relating to levels of participation in graphical form. For example, during an event or after conclusion of the event, the graph module 110 can present to a broadcaster of the event a graph of a number of users who are or were in online attendance with the event over the duration of the event. In some instances, such a graph can be reflected as a line graph, bar graph, or other suitable form of graph. As another example, during an event or after conclusion of the event, the graph module 110 can present to a broadcaster of the event a graph of a number of users who liked the event, messaged another user participating in the event, commented on the event, shared the event, or performed other interactions relating to the event over selected time intervals of the event. The graph module 110 can present such graphs for display on a client computing device associated with the broadcaster. Graphical presentation of event information in this manner can allow the broadcaster to analyze changes in user behavior relating to an event over time.

The graph module 110 can allow interactions by a broadcaster with a graph of event information for critical analysis of an event. The graph module 110 can create a graph based on a time duration corresponding to duration of an event. The graph can be created so that the broadcaster can select various positions on the graph corresponding to various times covered by the graph. Such selection can be made by suitable command to an input system of a client computing device presenting the graph, such as a click of a mouse, a tap to a touch screen a tap, or the like. When the broadcaster selects a particular position on the graph corresponding to an instant (or interval) of time, the graph module 110 can provide event information that corresponds to that instant (or interval) of time. For example, the graph module 110 can present to the broadcaster one or more frames of a video recording of the event that correspond with the instant (or interval) of time associated with the selected position on the graph.

The graph module 110 can present one type of event information through a graph and present another type of event information based on an instant (or interval) of time corresponding to a selected position on the graph. For example, the graph module 110 can present a graph of a level of online user attendance over the duration of an event. If a broadcaster selects a particular position on the graph corresponding to an instant of time covered by the graph, the graph module 110 can present a number of likes for the event that have been received up to the instant of time. As another example, the graph module 110 can present a graph of a number of likes from users based on selected time intervals over the duration of an event. If a broadcaster selects a position on the graph corresponding to a particular time interval, the graph module 110 also can present information relating to a number of comments that users posted regarding the event during the particular time interval. Many variations are possible.

The graph module 110 can apply one or more of various techniques to optimize the appearance of a graph. Some graphs of event information, such as line graphs relating to levels of participation, can reflect erratic user behavior over time. For example, such user behavior can be represented in a graph with short, wide swings. In some embodiments, to optimize the appearance and usability of such graphs, the graph module 110 can selectively apply a smoothing algorithm and point consolidation to a graph before presentation of the graph to a broadcaster.

The summary and suggestions module 112 can provide a summary of event information upon conclusion of an event. In some embodiments, if a level of participation for the event satisfies a threshold value, the summary and suggestions module 112 can provide an indication of praise or congratulations to the broadcaster. Such indication can take any suitable form, such as a statement of congratulations, a statement of the amount of the level of participation, a happy face, etc. For example, for an event having a level of participation that satisfied a threshold value, the summary and suggestions module 112 can present to the broadcaster a statement of congratulations, the number of users who were in online attendance with the event, a cumulative number of users who were in online attendance with the event and previous events of the broadcaster, or any combination thereof.

If a level of participation for the event does not satisfy a threshold value, the summary and suggestions module 112 can provide advice or suggestions to a broadcaster to optimize a future event. The advice or suggestions can be provided to improve levels of participation in a future event of the broadcaster. The advice or suggestions can be based on metadata maintained by a social networking system relating to events that achieved high levels of participation or were otherwise determined to be successful. Such advice or suggestions can include, for example, a request to add a friend or add a hashtag before broadcast of the event.

The summary and suggestions module 112 can provide cumulative statistics relating to event information. For example, upon conclusion of an event, the summary and suggestions module 112 can provide a cumulative indication of levels of participation for the concluded event and one or more previous events of the broadcaster. In one instance, the summary and suggestions module 112 can provide a total count of likes, comments, or shares received by the broadcaster across some or all previous events.

The summary and suggestions module 112 can provide an indication of the identity of users who participated in an event after conclusion of the event. In some embodiments, the summary and suggestions module 112 can present to a broadcaster a list of users who were in online attendance with the event. In some embodiments, the summary and suggestions module 112 can provide a segmentation by user category of the users who were in online attendance. For example, the summary and suggestions module 112 can present a list of connections of the broadcaster who were in attendance. As another example, the summary and suggestions module 112 can present a list of verified entities, topic authorities, experts, or influencers, or any combination of the foregoing, to the broadcaster.

In some embodiments, the broadcast management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the broadcast management module 102 can be, in part or in whole, implemented as software running on one or more computing devices or systems, such as on a server or a client computing device. For example, the broadcast management module 102 can be, in part or in whole, implemented within or configured to operate in conjunction or be integrated with a social networking system (or service), such as a social networking system 630 of FIG. 6. As another example, the broadcast management module 102 can be implemented as or within a dedicated application (e.g., app), a program, or an applet running on a user computing device or client computing system. In some instances, the broadcast management module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the broadcast management module 102. The data can include data relating to, for example, a video (and audio) of a broadcasted event, event information such as levels of participation in the event, threshold values relating to levels of participation, metadata regarding effective historical events, suggestions to optimize events, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the broadcast management module 102 can be configured to communicate and/or operate with the data store 118.

Figure 2:
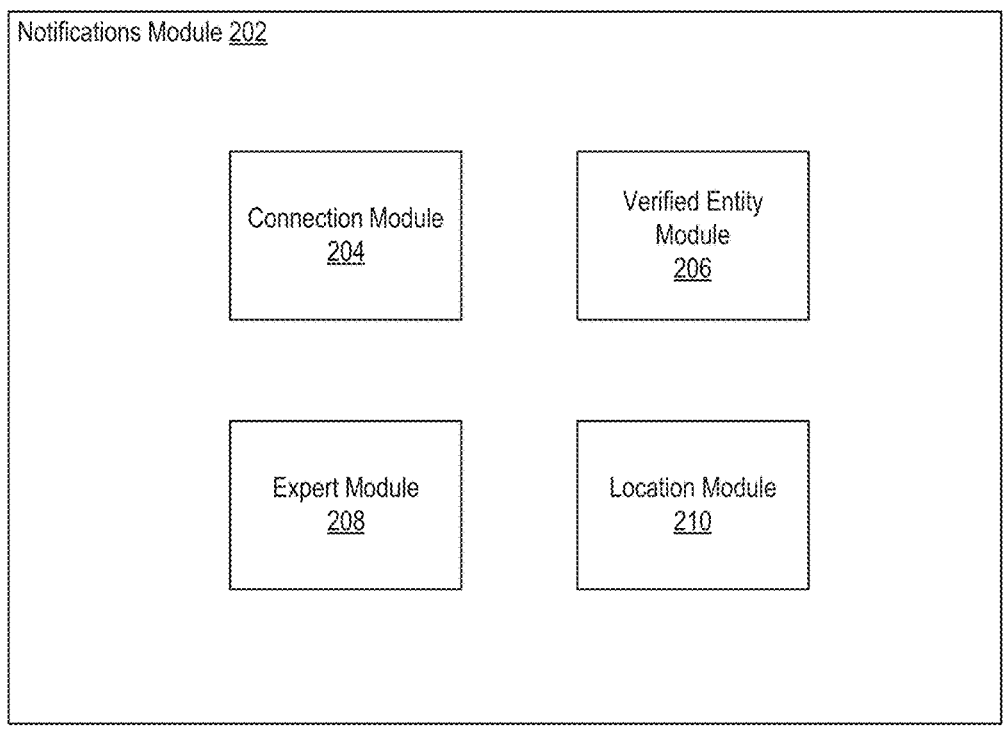
FIG. 2 illustrates an example notifications module, according to an embodiment of the present technology.

FIG. 2 illustrates an example notifications module 202, according to an embodiment of the present technology. In some embodiments, the notifications module 108 of FIG. 1 can be implemented with the notifications module 202. The notifications module 202 can provide notifications to a broadcaster of an event or users participating in the event. The notifications can prompt further interaction between a broadcaster and a user participating in the event or between two users participating in the event. In some embodiments, the notifications provided by the notifications module 202 can be determined by the broadcaster or an administrator of a social networking system. As shown in the example of FIG. 2, the notifications module 202 can include a connection module 204, a verified entity module 206, an expert module 208, and a location module 210.

The connection module 204 can provide notifications to a broadcaster regarding connections of the broadcaster who are participating in an event or to a user regarding connections of the user who are participating in the event. The connection module 204 can provide notifications regarding connections based on a determination of participation of connections in the event by the event monitoring module 106. For example, the connection module 204 can provide notifications to the broadcaster identifying connections who are within a selected number of degrees of separation from the broadcaster in a social networking system. As another example, the connection module 204 can provide notifications to the user identifying connections who are within a selected number of degrees of separation from the user in the social networking system. In some cases, the selected number of degrees of separation can be one degree of separation, two degrees of separation, etc. The selected number of degrees of separation can be configured by the broadcaster, an administrator of the social networking system, or a user. A notification to the broadcaster or to a user can be provided at various times, such as within a threshold time duration from the time that a connection begins participation in the event. The connections module 204 also can provide a notification to a broadcaster or to a user within a threshold time duration from the time a connection ends participation in the event. The notification can include an option to initiate communication between the two entities.

The verified entity module 206 can provide a notification to a broadcaster or to users participating in an event regarding participation of a verified entity in the event. The verified entity module 206 can provide notifications regarding verified entities based on a determination of participation of verified entities in the event by the event monitoring module 106. The notification can identify the verified entity to the broadcaster or to the user. A notification can be provided at various times, such as within a threshold time duration from the time a verified entity begins participation in the event and within a threshold time duration when the verified entity ends participation in the event. The notification can include an option to initiate communication between the two entities.

The expert module 208 can provide a notification to a broadcaster or to users participating in an event regarding participation of a topic authority, expert, or influencer in the event. The expert module 208 can provide notifications regarding topic authorities, experts, or influencers based on a determination of participation of one or more of them in the event by the event monitoring module 106. The notification can identify the topic authority, expert, or influencer to the broadcaster or to the user. The notification can include an option to initiate communication between the two entities. A notification can be provided at various times, such as within a threshold time duration from the time the topic authority, expert, or influencer begins participation in the event and within a threshold time duration from the time the topic authority, expert, or influencer ends participation in the event.

The location module 210 can provide a notification to a broadcaster or to a first user participating in an event when a second user participating in the event is within a threshold geographic distance from the broadcaster or the user. Geographic locations of the broadcaster, the first user, and the second user can be determined by the event monitoring module 106. When the location between a broadcaster and a user is within a first distance threshold value, the broadcaster can be notified about the user, the user can be notified about the broadcaster, or both. The notification can include an option to initiate communication between the broadcaster and the user. When the location between a first user and a second user is within a second distance threshold value, a notification can be provided to each user about the existence and proximity of the other user. The notification can include an option to allow the users to initiate communication with one another. The notifications provided by the locations module 210 can be provided when a distance threshold value is satisfied for a broadcaster and a user or between two users.

Figure 3:
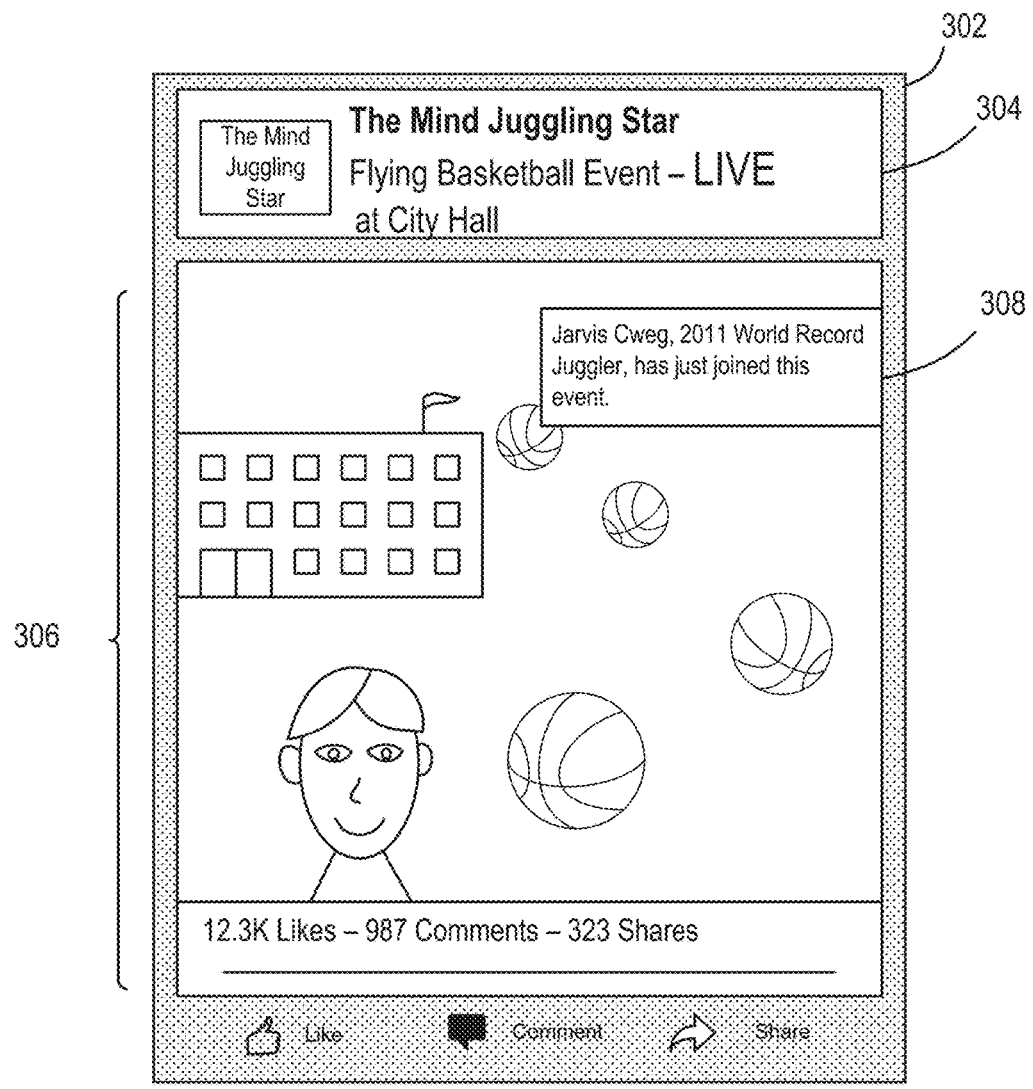
FIG. 3 illustrates an example user interface for receiving a notification, according to an embodiment of the present technology.

FIG. 3 illustrates an example user interface 302 presented on a screen of a computing device of a broadcaster of a broadcasted event or a user participating in the event, according to an embodiment of the present technology. The user interface 302 presents a page relating to the event having a title section 304 and an event stream section 308. The title section 304 can include information regarding the event, such as an identification of a broadcaster associated with the event and a description of the event. The event stream section 308 can present to the broadcaster or to a user participating in the event a live video stream of the event as it transpires in real time (or near real time). As the event transpires, the broadcaster or the user can receive notifications about other users who are participating in the event. A notification 308 is presented in the user interface 302 to indicate that a user has joined the event. As shown, the notification 308 indicates that a high profile user, such as a verified entity, topic authority, expert, or influencer, has joined the event. In other scenarios, a notification can be presented that indicates that another user has joined the event, such as a connection of the broadcaster or the user.

Figure 4A:
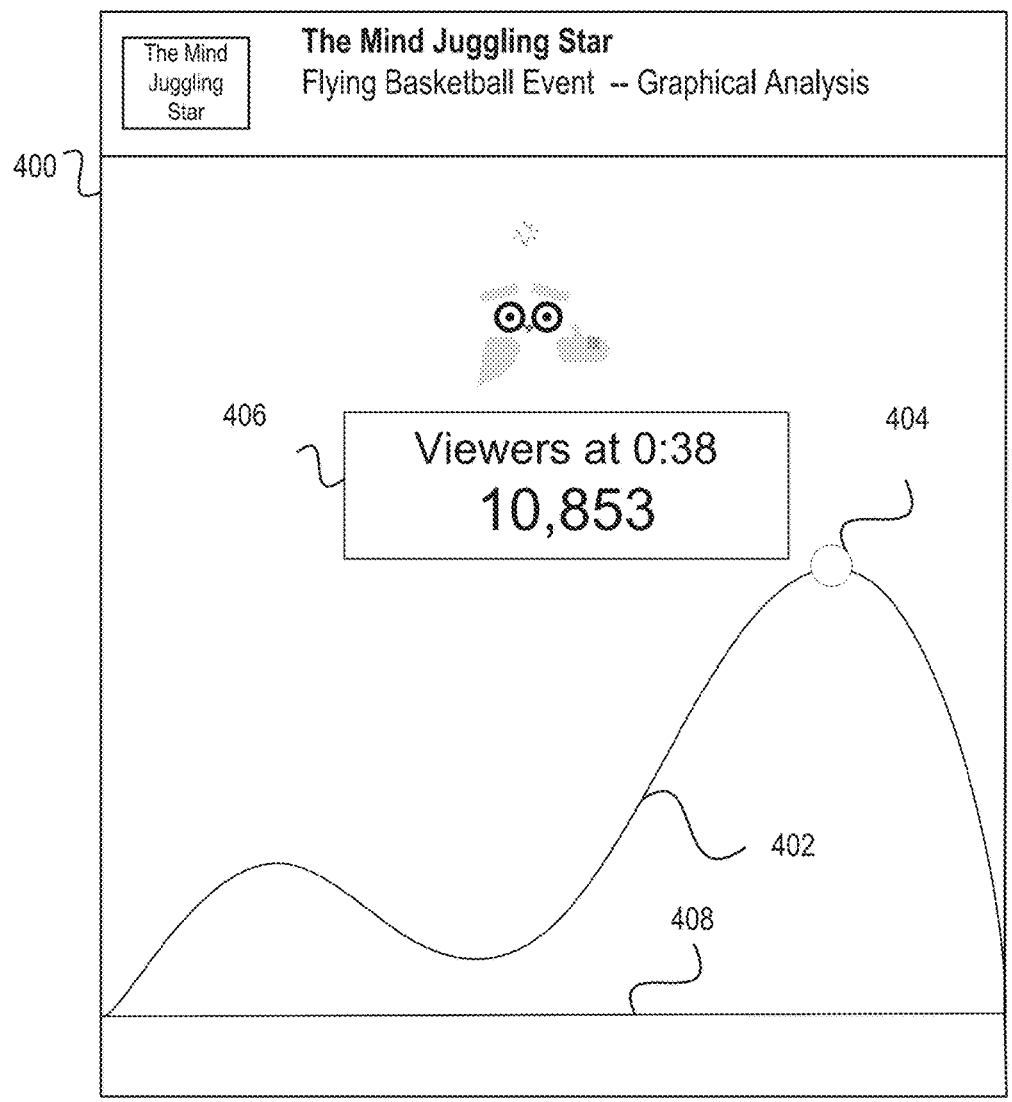
FIG. 4A illustrates an example user interface for presenting a graph of a level of participation in an event, according to an embodiment of the present technology.

FIG. 4A illustrates an example user interface 400 presented on a screen of a computing device of a broadcaster of a broadcasted event, according to an embodiment of the present technology. The user interface 400 presents a graph 402 over a time axis 408 reflecting event information relating to a level of participation in the event. The graph 402 is presented to allow dynamic interaction with the broadcaster. The graph 402 can allow the broadcaster to analyze changes in level of participation in the event as the event transpires and to obtain related event information. As shown, the level of participation reflected on the graph 402 relates to a number of viewers who consumed the event over a time duration of the event. In other examples, a different graph can reflect other user activities in connection with the event, such as a number of likes, comments, or shares during selected time intervals of the event. At a position 404 in the graph 402, a maximum number of users participated in the event. In response to selection by the broadcaster of position 404, an indication 406 can be presented to the broadcaster. The indication 406 can provide event information at the time corresponding to position 404. In particular, the indication 406 provides the number of users who were viewing the event at the time corresponding to position 404. Selection of a different position along the graph 402 can cause presentation of the number of users were viewing the event at the time corresponding to the different position. In other embodiments, the user interface 400 can present one or more video frames of the event associated with a time corresponding to a selected position on the graph 402. The presentation of video frames in this manner can assist the broadcaster in correlating a level of participation at a particular time during the event with a contemporaneous activity of the event at the particular time.

Figure 4B:
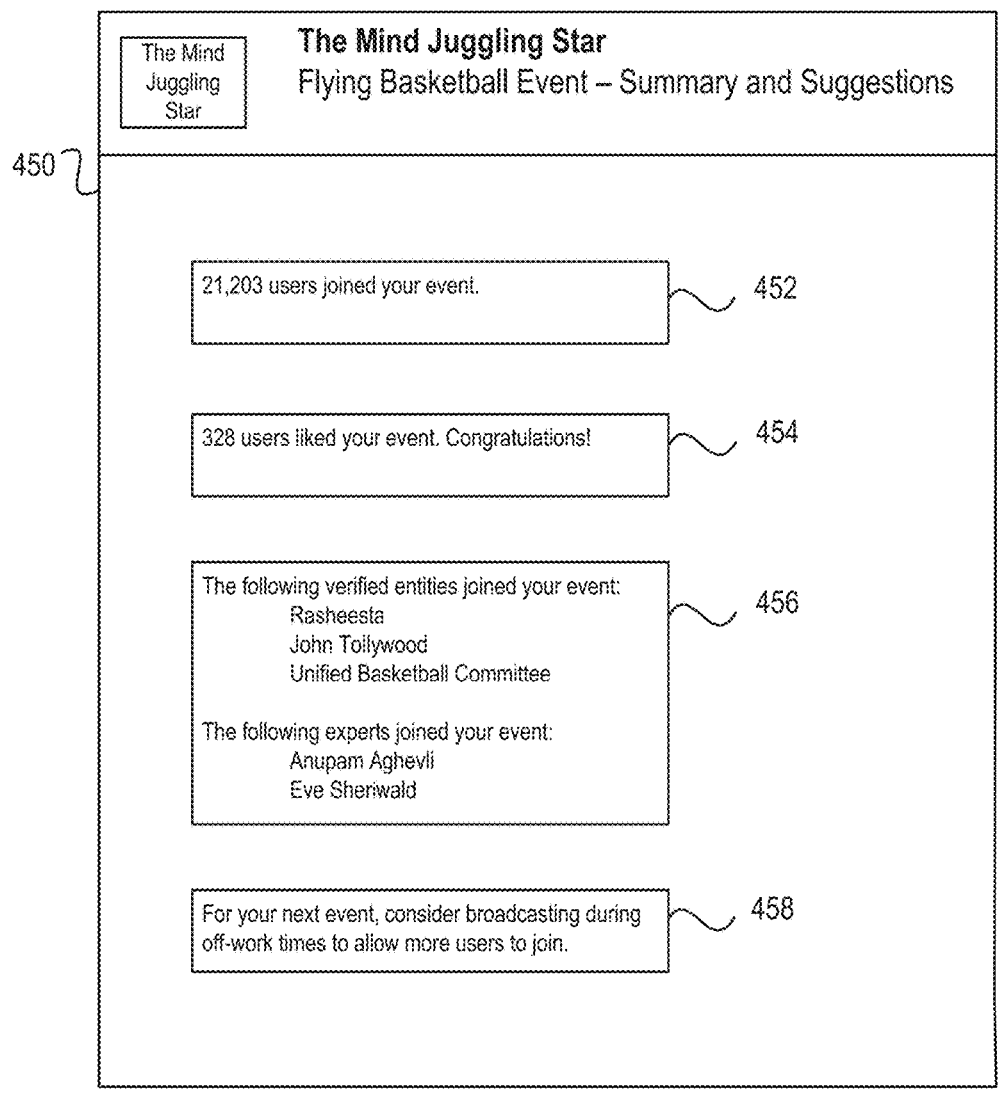
FIG. 4B illustrates an example user interface for presenting summary information and suggestions to a broadcaster, according to an embodiment of the present technology.

FIG. 4B illustrates an example user interface 450 presented on a screen of a computing device of a broadcaster of a broadcasted event, according to an embodiment of the present technology. The user interface 450 provides a summary of event information and suggestions to improve the performance of future events of the broadcaster. The summary event information and suggestions can be provided in a variety of possible manners. In the example shown, the summary event information and suggestions are provided as a series of references. A reference 452 communicates the number of users who joined the event. A reference 454 communicates the number of users who liked the event, and also provides congratulations to the broadcaster for achieving a level of participation relating to likes that satisfies a threshold value. A reference 456 lists the identity of verified entities and experts (e.g., topic authorities, experts, influencers, etc.) who joined the event. In the example shown, a level of participation relating to the number of users who joined the event did not satisfy a threshold value. As a result, a reference 458 communicates a suggestion for the broadcaster to consider so that a next broadcasted event of the broadcaster can be optimized.

Figure 5A:
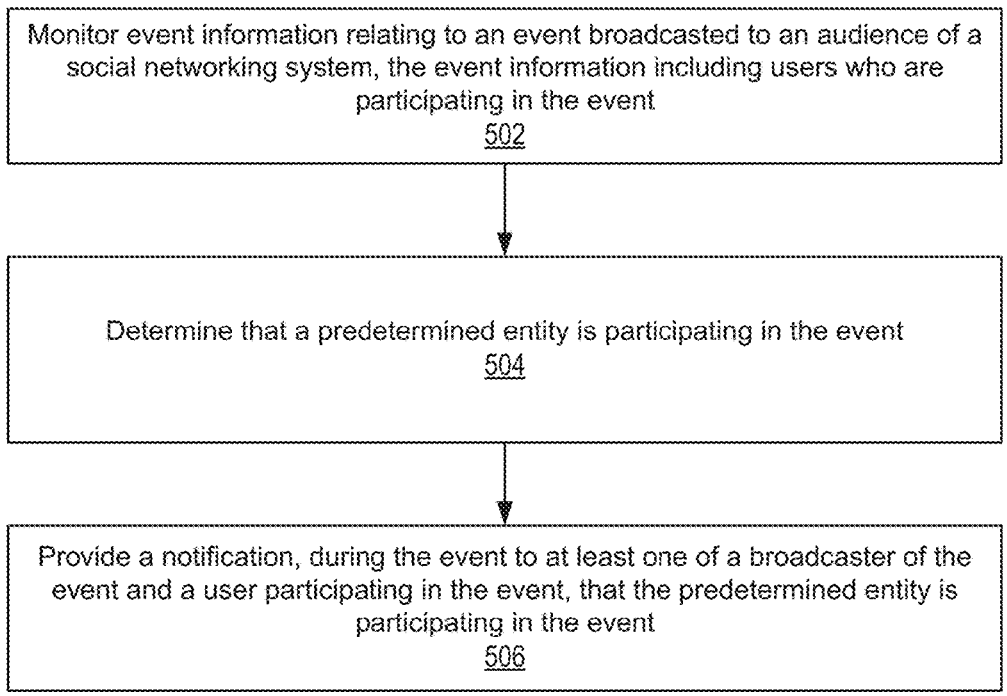
FIG. 5A illustrates a first method to manage a broadcasted event, according to an embodiment of the present technology.

FIG. 5A illustrates an example method 500 to manage an event broadcasted to users of a social networking system, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can monitor event information relating to an event broadcasted to an audience of a social networking system. The event information can include users who are participating in the event. At block 504, the method 500 can determine that a predetermined entity is participating in the event. At block 506, the method 500 can provide a notification, during the event to at least one of a broadcaster of the event and a user participating in the event, that the predetermined entity is participating in the event. Other suitable techniques that incorporate various features and embodiments of the present technology are possible.

FIG. 5B illustrates an example method 550 to manage an event broadcasted to users of a social networking system, according to an embodiment of the present technology. It should be appreciated that there can be additional, fewer, or alternative steps performed in similar or alternative orders, or in parallel, in accordance with the various embodiments and features discussed herein unless otherwise stated.

At block 552, the method 550 can present event information in a graph to a broadcaster at least one of during an event and after conclusion of the event. At block 554, the method 550 can receive a selection by the broadcaster of a position on the graph. At block 556, the method 550 can provide event information relating to a level of participation in the event at a time corresponding to the position on the graph. At block 558, the method 550 can provide a suggestion to optimize a level of participation for a future event of the broadcaster when a level of participation for the event does not satisfy a threshold value. Other suitable techniques that incorporate various features and embodiments of the present technology are possible.

Social Networking System—Example Implementation

Figure 6:
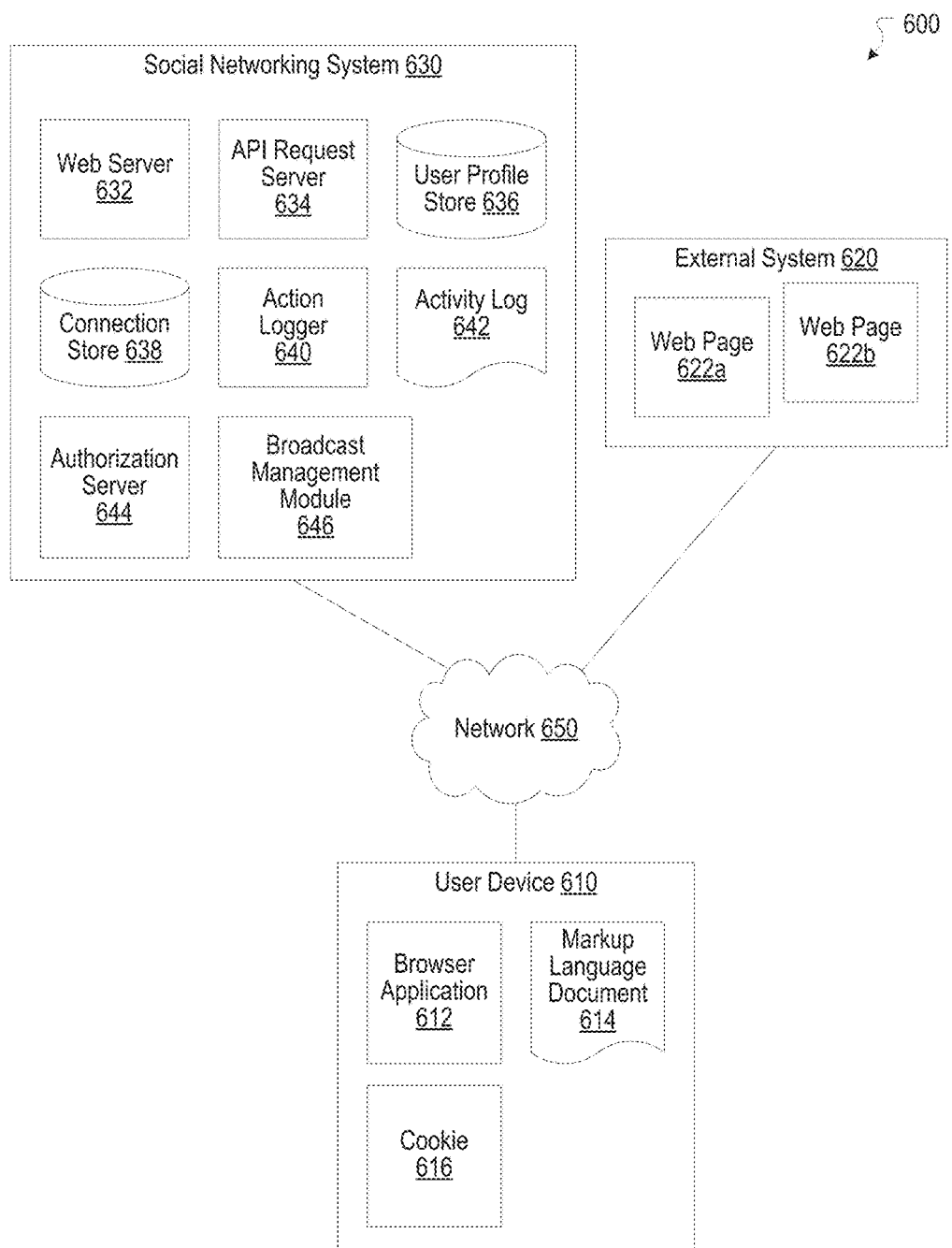
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way," For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention; the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example; if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620; or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example; the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities; with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a broadcast management module 646. The broadcast management module 646 can be implemented with the broadcast management module 102, as discussed in more detail herein. In some embodiments, one or more functionalities of the broadcast management module 646 can be implemented in the user device 610.

Hardware Implementation

Figure 7:
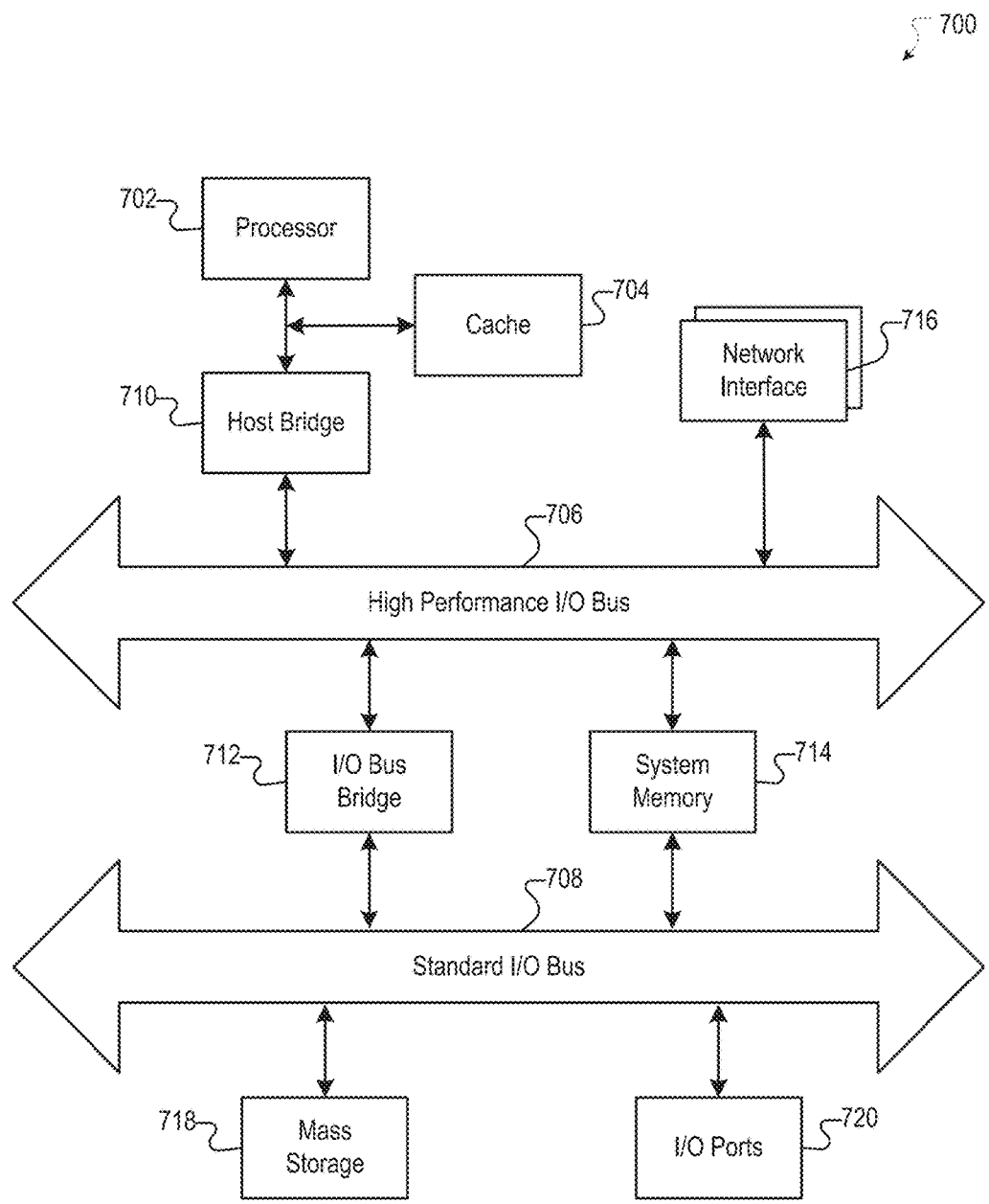
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   monitoring, by a computing system, event information relating to an event broadcasted to an audience of a social networking system, the event information including users who are participating in the event;
   determining, by the computing system, that a predetermined entity is participating in the event;
   providing, by the computing system, to a user participating in the event, a notification during the event identifying the predetermined entity and indicating that the predetermined entity is participating in the event, wherein the notification comprises an option to initiate communication with the predetermined entity; and
   providing, by the computing system, to the user participating in the event, a second notification during the event indicating that the predetermined entity is no longer participating in the event.

2. The computer-implemented method of claim 1, wherein the predetermined entity is a connection of at least one of the broadcaster and the user.

3. The computer-implemented method of claim 1, wherein the predetermined entity is at least one of a verified entity, a topic authority, an expert, and an influencer.

4. The computer-implemented method of claim 1, wherein the providing the notification comprises:
   providing the notification within a threshold time duration from a time that the predetermined entity joins the event.

5. The computer-implemented method of claim 1, wherein the predetermined entity is geographically located within a threshold distance from the user.

6. The computer-implemented method of claim 1, wherein the event information includes levels of participation in the event relating to at least one of a number of users who joined the event online, a number of users who liked the event, a number of users who commented on the event, and a number of users who shared the event.

7. The computer-implemented method of claim 1, further comprising:
   presenting the event information in a graph to the broadcaster at least one of during the event and after conclusion of the event.

8. The computer-implemented method of claim 1, further comprising:
   receiving a selection by the broadcaster of a position on the graph; and
   providing event information relating to a level of participation in the event at a time corresponding to the position on the graph.

9. The computer-implemented method of claim 8, further comprising:
   in response to the selection of the position on the graph, presenting one or more video frames of the event corresponding to the time corresponding to the position on the graph.

10. The computer-implemented method of claim 1, further comprising:
    providing a suggestion to optimize a level of participation for a future event of the broadcaster when a level of participation for the event does not satisfy a threshold value.

11. A system comprising:
    at least one processor; and
    a memory storing instructions that, when executed by the at least one processor, cause the system to perform:
    monitoring event information relating to an event broadcasted to an audience of a social networking system, the event information including users who are participating in the event;

determining that a predetermined entity is participating in the event;

providing to a user participating in the event notification during the event identifying the predetermined entity and indicating that the predetermined entity is participating in the event, wherein the notification comprises an option to initiate communication with the predetermined entity; and providing, to the user participating in the event, a second notification during the event indicating that the predetermined entity is no longer participating in the event.

12. The system of claim 11, wherein the predetermined entity is a connection of at least one of the broadcaster and the user.

13. The system of claim 11, wherein the predetermined entity is at least one of a verified entity, a topic authority, an expert, and an influencer.

14. The system of claim 11, wherein the providing the notification comprises:

providing the notification within a threshold time duration from a time that the predetermined entity joins the event.

15. The system of claim 11, wherein the predetermined entity is geographically located within a threshold distance from the user.

16. A non-transitory computer-readable storage medium including instructions that, when executed by at least one processor of a computing system, cause the computing system to perform a method comprising:

monitoring event information relating to an event broadcasted to an audience of a social networking system, the event information including users who are participating in the event;

determining that a predetermined entity is participating in the event;

providing to a user participating in the event notification during the event identifying the predetermined entity and indicating that the predetermined entity is participating in the event, wherein the notification comprises an option to initiate communication with the predetermined entity; and providing, to the user participating in the event, a second notification during the event indicating that the predetermined entity is no longer participating in the event.

17. The non-transitory computer-readable storage medium of claim 16, wherein the predetermined entity is a connection of at least one of the broadcaster and the user.

18. The non-transitory computer-readable storage medium of claim 16, wherein the predetermined entity is at least one of a verified entity, a topic authority, an expert, and an influencer.

19. The non-transitory computer-readable storage medium of claim 16, wherein the providing the notification comprises:

providing the notification within a threshold time duration from a time that the predetermined entity joins the event.

20. The non-transitory computer-readable storage medium of claim 16, wherein the predetermined entity is geographically located within a threshold distance from the user.

* * * * *